United States Patent
Cohn et al.

(10) Patent No.: US 11,729,663 B2
(45) Date of Patent: *Aug. 15, 2023

(54) APPARATUS, SYSTEM AND METHOD OF CONCURRENT MULTIPLE BAND (CMB) WIRELESS COMMUNICATION

(71) Applicant: INTEL CORPORATION, Santa Clara, CA (US)

(72) Inventors: Daniel Cohn, Raanana (IL); David Birnbaum, Modiin (IL); Ehud Reshef, Qiryat Tivon (IL); Ofer Hareuveni, Haifa (IL); Dor Chay, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,557

(22) Filed: Dec. 23, 2021

(65) Prior Publication Data
US 2022/0201541 A1  Jun. 23, 2022

Related U.S. Application Data

(63) Continuation of application No. 16/726,882, filed on Dec. 25, 2019, now Pat. No. 11,223,970.

(51) Int. Cl.
*H04W 28/02* (2009.01)
*H04W 40/12* (2009.01)

(52) U.S. Cl.
CPC ....... *H04W 28/0268* (2013.01); *H04W 40/12* (2013.01)

(58) Field of Classification Search
CPC ............ H04W 28/02; H04W 28/0231; H04W 28/0236; H04W 28/0242; H04W 28/0247;
(Continued)

(56) References Cited

U.S. PATENT DOCUMENTS 8,880,007 B1  11/2014 Mansour et al.
10,263,667 B2 *  4/2019 Zakaria ............... H04W 28/021
(Continued)

FOREIGN PATENT DOCUMENTS

CA  2910079 A1 *  10/2014  ........... H04L 1/0006
EP  1616411 A1 *  1/2006  ............. H04L 45/00
(Continued)

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
(Continued)

*Primary Examiner* — Kevin D Mew
(74) *Attorney, Agent, or Firm* — Shichrur & Co.

(57) ABSTRACT

For example, a wireless communication device may be configured to determine a Concurrent Multiple Band (CMB) routing scheme based on Quality of Service (QoS) requirement information and network condition information, the CMB routing scheme to route a plurality of application streams to a plurality of radios of the wireless communication device for wireless communication over a plurality of wireless communication bands, the plurality of application streams corresponding to one or more applications to be executed by the wireless communication device; and to route the plurality of application streams to the plurality of radios by determining, based on the CMB routing scheme, to which radio of the plurality of radios to route the application stream of the plurality of application streams.

20 Claims, 6 Drawing Sheets

(58) Field of Classification Search
CPC ......... H04W 28/0268; H04W 28/0967; H04W 28/0983; H04W 28/0992; H04W 28/10; H04W 28/16; H04W 28/18; H04W 28/20; H04W 40/12; H04W 40/16
See application file for complete search history.

(56) References Cited

U.S. PATENT DOCUMENTS

| | | | |
|---|---|---|---|
| 10,531,360 B1 | 1/2020 | Govindassamy | |
| 10,819,566 B2 | 10/2020 | Chew | |
| 10,849,171 B2 * | 11/2020 | Iwami | H04W 92/18 |
| 11,019,183 B2 | 5/2021 | Alam | |
| 11,038,895 B2 | 6/2021 | Bartfai-Walcott et al. | |
| 11,122,638 B2 | 9/2021 | Hareuveni et al. | |
| 11,223,970 B2 | 1/2022 | Cohn et al. | |
| 2003/0033394 A1 | 2/2003 | Stine | |
| 2005/0201296 A1 | 9/2005 | Vannithamby et al. | |
| 2009/0147722 A1 * | 6/2009 | Ramachandran | H04L 45/124 370/315 |
| 2009/0225658 A1 * | 9/2009 | Rezvani | H04W 40/06 370/254 |
| 2010/0026547 A1 * | 2/2010 | Weissman | H04B 1/109 342/16 |
| 2010/0136998 A1 | 6/2010 | Lott et al. | |
| 2011/0111780 A1 | 5/2011 | Hillan et al. | |
| 2011/0149764 A1 | 6/2011 | Wietfeldt et al. | |
| 2012/0236713 A1 | 9/2012 | Kakadia et al. | |
| 2012/0294161 A1 | 11/2012 | Sunay et al. | |
| 2012/0307886 A1 | 12/2012 | Agarwal et al. | |
| 2014/0169192 A1 | 6/2014 | Zhang et al. | |
| 2014/0269461 A1 | 9/2014 | Mehta | |
| 2015/0304879 A1 * | 10/2015 | Dacosta | H04W 4/14 370/235 |
| 2018/0167948 A1 * | 6/2018 | Egner | H04W 76/16 |
| 2018/0183468 A1 | 6/2018 | Emmanuel et al. | |
| 2019/0272187 A1 | 9/2019 | Smith et al. | |
| 2020/0107338 A1 * | 4/2020 | Egner | H04W 72/1215 |
| 2020/0145967 A1 | 5/2020 | Park et al. | |
| 2020/0259737 A1 * | 8/2020 | Koshy | H04W 28/0883 |
| 2021/0067505 A1 | 3/2021 | Gandhi et al. | |
| 2021/0204340 A1 | 7/2021 | Hareuveni et al. | |
| 2021/0409089 A1 * | 12/2021 | Haider | H04B 17/336 |
| 2022/0070955 A1 | 3/2022 | Hareuveni et al. | |

FOREIGN PATENT DOCUMENTS

| | | | | |
|---|---|---|---|---|
| WO | WO-02078229 A1 * | 10/2002 | | H04L 45/02 |
| WO | WO-2008064186 A2 * | 5/2008 | | H04L 45/00 |
| WO | 2011123839 | 10/2011 | | |

OTHER PUBLICATIONS

Killer DoubleShot Pro—Killer Networking | Killernetworking | Killer Control Center; retrieved from www.killernetworking.com/technologies/killer-doubleshot-pro/[Mar. 8, 2020 9:44:20 AM], 2 pages.

Notice of Allowance for U.S. Appl. No. 16/726,884, dated May 13, 2021, 14 pages.

Office Action for U.S. Appl. No. 16/726,882, dated May 26, 2021, 27 pages.

Notice of Allowance for U.S. Appl. No. 16/726,882, dated Sep. 7, 2021, 17 pages.

Office Action for U.S. Appl. No. 17/472,932, dated Jan. 12, 2023, 17 pages.

* cited by examiner

APPARATUS, SYSTEM AND METHOD OF CONCURRENT MULTIPLE BAND (CMB) WIRELESS COMMUNICATION

TECHNICAL FIELD

Embodiments described herein generally relate to Concurrent Multiple Band (CMB) wireless communication.

BACKGROUND

Some wireless network adapters may allow concurrent communication with multiple Basic Service Sets (BSSs).

The BSSs may be in different wireless communication bands, e.g., a 2.4 Gigahertz (GHz) band, a 5 GHz band, and/or in a 6-7 GHz band.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
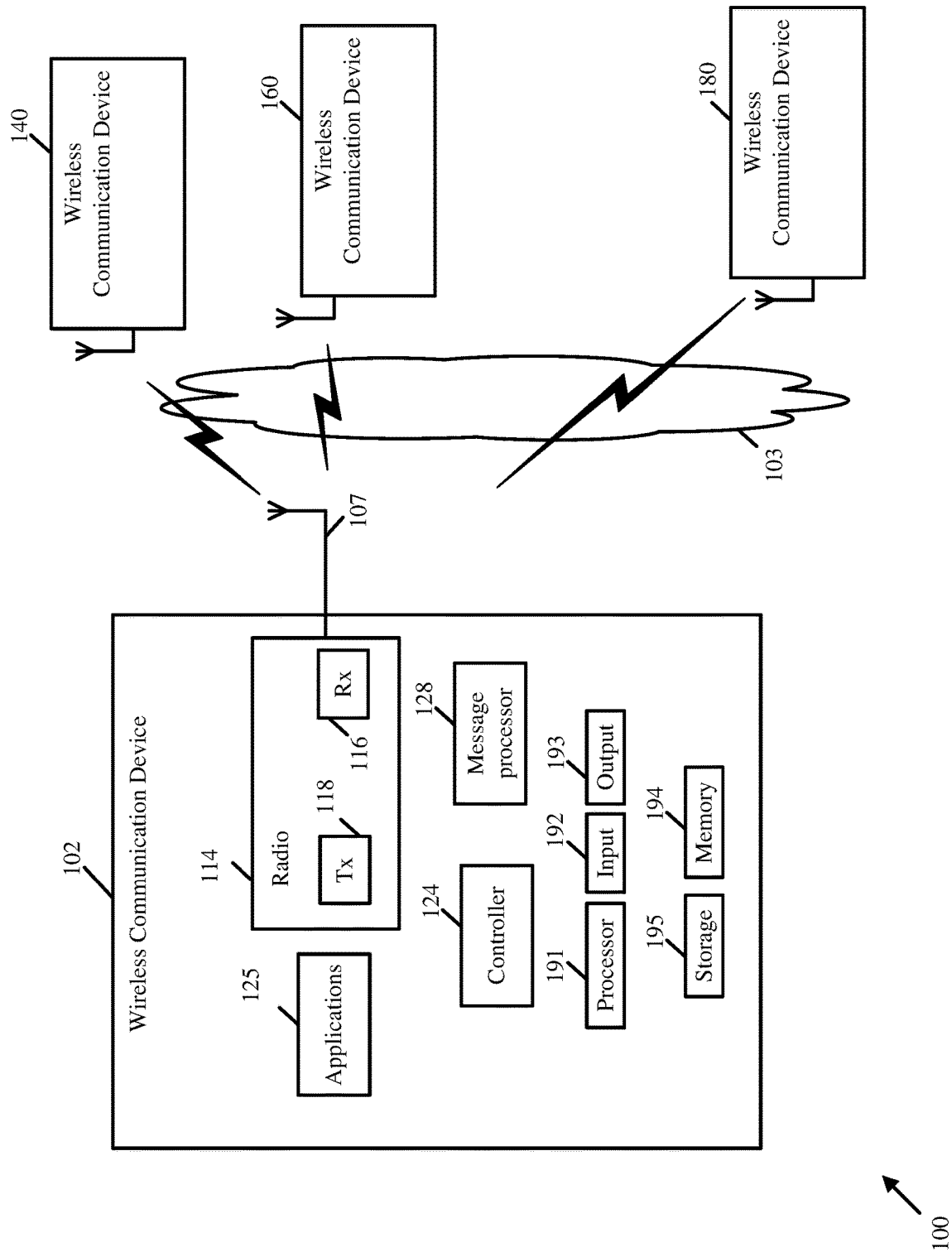
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016), and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, 5 GHz, and/or 6-7 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, devices 102, 140, 160 and/or 180 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one or more of wireless communication devices 102, 140, 160 and/or 180, e.g., devices 140, 160 and/or 180, may include, operate as, and/or perform the functionality of an Access Point (AP) STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components.

In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a 6-7 GHz frequency band, a millimeterWave (mmWave) frequency band, e.g., a 60 GHz frequency band, a Sub-1 GHz (S1G) band, and/or any other frequency band.

In some demonstrative embodiments, devices 102, 140, 160 and/or 180 may include one or more radios including circuitry and/or logic to perform wireless communication between devices 102, 140, 160 and/or 180, and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, a 6 GHz frequency band, e.g., a 6-7 GHz frequency band, a mmWave band, a S1G band, and/or any other band.

In some demonstrative embodiments, radio 114 may include, or may be associated with, one or more antennas 107.

In one example, device 102 may include a single antenna 107. In another example, device may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102, 140, 160 and/or 180 may form, or may communicate as part of, a wireless local area network (WLAN).

In some demonstrative embodiments, wireless communication devices 102, 140, 160 and/or 180 may form, or may communicate as part of, a Wi-Fi network.

In other embodiments, wireless communication devices 102, 140, 160 and/or 180 may form, and/or communicate as part of, any other additional or alternative network.

In some demonstrative embodiments, devices 140, 160 and/or 180 may include, operate as, perform the role of, and/or perform one or more functionalities of an AP STA.

In some demonstrative embodiments, devices 102 may include, operate as, perform the role of, and/or perform one or more functionalities of, one or more STAs. For example, device 102 may include at least one STA.

In some demonstrative embodiments, radio 114 may include a plurality of radios 114 connected to one or more antennas 107.

In some demonstrative embodiments, device 102 may include one or more applications 125 to provide one or more services, operations, and/or information to a user of device 102, for example, from the Internet, and/or any other network.

In some demonstrative embodiments, device 102 and/or radios 114 may be configured to allow concurrent communication with a plurality of Basic Service Sets (BSSs).

In some demonstrative embodiments, the plurality of BSSs may be in different wireless communication bands. For example, the plurality of BSSs may be in a 2.4 Gigahertz (GHz) band, a 5 GHz band, a 6 GHz band, and/or any other band.

In some demonstrative embodiments, the plurality of radios 114 may be configured to communicate in the plurality of BSSs, for example, by communicating over a Concurrent Multiple Band (CMB) in the 2.4 GHz band, the 5 GHz band, and/or the 6 GHz band.

In some demonstrative embodiments, the CMB may be defined as a concurrent communication over multiple bands, e.g., in the plurality of BSSs.

In some demonstrative embodiments, the CMB may be configured to allow achieving higher data rates, providing a better Quality of Service (QoS), and/or any other performance enhancements.

In one example, the CMB may be configured to improve user QoS, for example, especially for latency-sensitive applications, e.g., gaming, conversational voice and video, for example, especially in congested WiFi environments.

In some demonstrative embodiments, there may be a need to address one or more technical inefficiencies, disadvantages and/or problems in one or more use cases and/or scenarios, for example, when routing application streams of the one or more applications 125, for example, to different BSSs.

In some demonstrative embodiments, it may be inefficient to perform static routing of data from different applications to different networks according to a user configuration, e.g., including different network types such as Ethernet, WiFi or cellular, based on user configuration or on reported network speed, e.g., as described below.

In one example, the static routing may not take into account to possible connection or network dynamics. For example, wireless network conditions may constantly vary, e.g., due to changes in RF propagation conditions, connected stations number, traffic load, and/or any other network conditions or attributes. Therefore, a static pre-configured traffic routing to different wireless networks may be suboptimal in terms of user QoS, performance, and/or efficiency.

In some demonstrative embodiments, device 102 may be configured to determine a CMB routing scheme, for example, to dynamically route the application streams of applications 125 to the different BSSs, for example, via the plurality of radios 114, e.g., as described below.

In some demonstrative embodiments, device 102 and/or controller 124 may be configured to dynamically adapt traffic routing to different wireless networks, for example, to optimize a user QoS and/or performance, e.g., as described below.

In some demonstrative embodiments, device 102 and/or controller 124 may be configured to monitor, e.g., constantly monitor, network conditions for connected BSSs, for example, based on network metrics provided by wireless NICs, e.g., radios 114; AP band information, e.g., from devices 140, 160 and/or 180; user/IT configured policy, and/or any other additional and/or alternative input, e.g., as described below.

Figure 2:
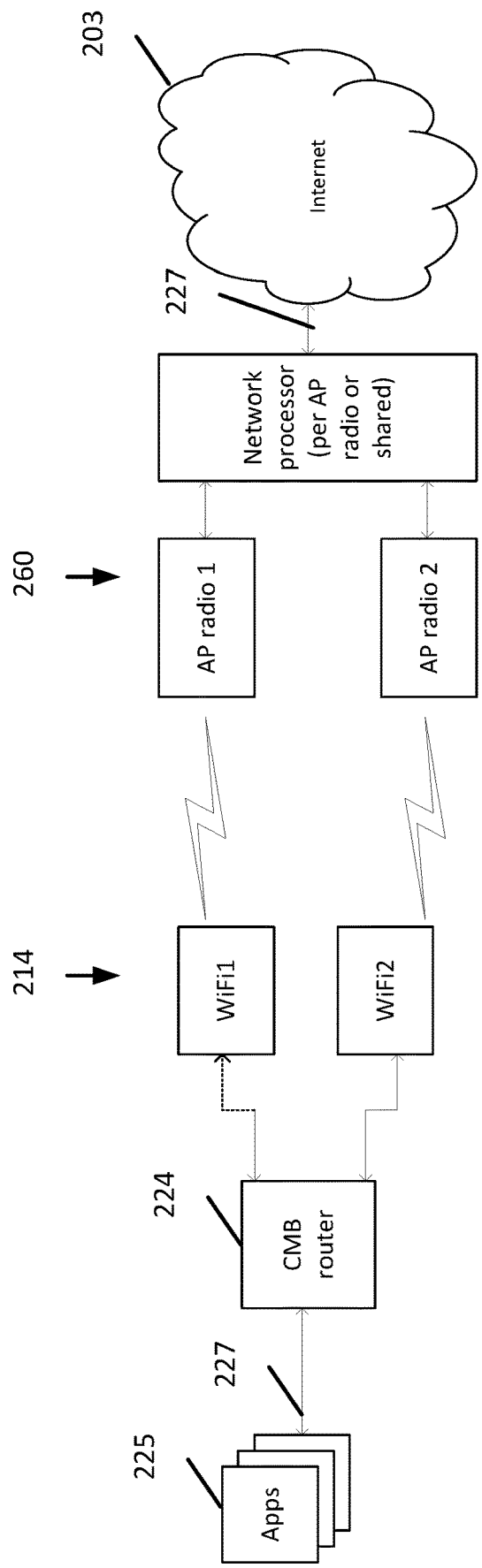
FIG. 2 is a schematic block diagram illustration of a Concurrent Multiple Band (CMB) data path, in accordance with some demonstrative embodiments.

Reference is made to FIG. 2, which schematically illustrates a block diagram of a CMB data path, in accordance with some demonstrative embodiments.

In some demonstrative embodiments, as shown in FIG. 2, a CMB router 224 may be implemented in a client device, e.g., device 102 (FIG. 1), for example, as part of an operating system of the device, as a middleware between an operating system network stack and/or wireless NIC drivers, e.g., drivers of radios 114 (FIG. 1), and/or by any other component of the device. For example, controller 124 (FIG. 1) may include, operate as, perform one or more operations of, and/or perform the functionality of, CMB router 224.

In some demonstrative embodiments, as shown in FIG. 2, one or more applications 225 may communicate traffic 227 with the Internet 203.

In some demonstrative embodiments, as shown in FIG. 2, a plurality of radios 214 may communicate with a plurality of APs 260. In one example, each AP 260 may communicate over a different BSS in a different wireless communication band.

In some demonstrative embodiments, the CMB router 224 may determine how to split the traffic 227 between the plurality of radios 214.

In one example, the traffic split may occur at different network model layers, e.g., a MAC Control Protocol (TCP) layer, an Internet Protocol (IP) layer, a MAC later, and the like. The traffic may be aggregated at some point in the network, e.g., at the AP, or some anchor point in the cloud or network, or it may stay split until the other end.

Referring back to FIG. 1, in some demonstrative embodiments, device 102 may be configured to determine a CMB routing scheme, for example, to route application streams of applications 125, e.g., as described below.

In some demonstrative embodiments, controller 124 may be configured to control, cause and/or trigger the STA implemented by device 102 to determine a CMB routing scheme based on Quality of Service (QoS) requirement information, network condition information, and/or any other additional or alternative information, e.g., as described below.

In some demonstrative embodiments, the CMB routing scheme may be configured to route a plurality of application streams to the plurality of radios 114 of device 102, for example, for wireless communication over a plurality of wireless communication bands, e.g., as described below.

In some demonstrative embodiments, the plurality of wireless communication bands may include a 2.4 GHz band, a 5 GHz band, and/or a 6 GHz band, e.g., as described below.

In other embodiments, the plurality of wireless communication bands may include any other additional or alternative wireless communication bands.

In some demonstrative embodiments, the plurality of application streams may correspond to the one or more applications 125 to be executed by device 102, e.g., as described below.

In some demonstrative embodiments, the QoS requirement information may include, for example, for an application stream of the plurality of application streams, information of one or more QoS requirements for the application stream, e.g., as described below.

In some demonstrative embodiments, the network condition information may include, for example, for a wireless communication band of the plurality of wireless communication bands, information of one or more network condition parameters for wireless communication over the wireless communication band, e.g., as described below.

In some demonstrative embodiments, controller 124 may be configured to control, cause and/or trigger the STA implemented by device 102 to route the plurality of application streams to the plurality of radios 114, for example, by determining, based on the CMB routing scheme, to which radio of the plurality of radios 114 to route the application stream of the plurality of application streams, e.g., as described below.

In some demonstrative embodiments, the one or more QoS requirements for the application stream may include a maximal acceptable latency of packets of the application stream, e.g., as described below.

In some demonstrative embodiments, the one or more QoS requirements for the application stream may include a minimum average traffic rate, e.g., as described below.

In some demonstrative embodiments, the one or more QoS requirements for the application stream may include a maximum acceptable jitter, and/or a minimum required peak traffic rate, e.g., as described below.

In other embodiments, the one or more QoS requirements for the application stream may include any other additional or alternative attributes and/or parameters, e.g., as described below.

In some demonstrative embodiments, the one or more network condition parameters may include one or more channel receive and/or transmit latency metrics, e.g., as described below.

In some demonstrative embodiments, the one or more network condition parameters may include a transmit or receive data rate of traffic, e.g., as described below.

In some demonstrative embodiments, the one or more network condition parameters may include one or more transmit queuing delay metrics, e.g., as described below.

In some demonstrative embodiments, the one or more network condition parameters may include a Receive Signal Strength Indicator (RSSI), one or more transmit or receive jitter metrics, and/or a receive Signal to Noise Ratio (SNR), e.g., as described below.

In other embodiments, the one or more network condition parameters may include any other additional or alternative attributes, metrics, ratios, indicators, measurements, and/or parameters, e.g., as described below.

In some demonstrative embodiments, controller 124 may be configured to control, cause and/or trigger the STA implemented by device 102 to determine the CMB routing scheme to route a first application stream of a first application of applications 125 to a first radio of the plurality of radios 114, and to route a second application stream of a second application of the one or more applications 125 to a second radio of the plurality of radios 107, e.g., as described below.

In one example, a first radio of radios 114 may communicate over a first network, e.g., a first BSS, in the 2.4 GHz band; and a second radio of radios 114 may communicate over a second network, e.g., a second BSS, in the 5 GHz band. According to this example, controller 124 determine the CMB routing scheme to route the first application stream of the first application to the first radio for wireless communication over the first BSS in the 2.4 GHz band, and to route the second application stream of the second application to the second radio for wireless communication over the second BSS in the 5 GHz band.

In some demonstrative embodiments, controller 124 may be configured to control, cause and/or trigger the STA implemented by device 102 to determine the CMB routing scheme to route a first application stream of a particular application of applications 125 to a first radio of the plurality of radios 107, and to route a second application stream of the particular application to a second radio of the plurality of radios 114, e.g., as described below.

In one example, a first radio of radios 114 may communicate over a first network, e.g., a first BSS, in the 2.4 GHz band; and a second radio of radios 114 may communicate over a second network, e.g., a second BSS, in the 5 GHz band. According to this example, controller 124 determine the CMB routing scheme to route the first application stream of the particular application to the first radio for wireless communication over the first BSS in the 2.4 GHz band, and to route the second application stream of the particular application to the second radio for wireless communication over the second BSS in the 5 GHz band.

In some demonstrative embodiments, device 102 may be configured to dynamically update the CMB routing scheme, e.g., as described below.

In some demonstrative embodiments, controller 124 may be configured to control, cause and/or trigger the STA implemented by device 102 to dynamically update the CMB routing scheme, for example, based on a change in the QoS requirement information and/or the network condition information, e.g., as described below.

In some demonstrative embodiments, device 102 may update the CMB routing scheme based on any other additional or alternative information, triggers and/or events, e.g., as described below.

In some demonstrative embodiments, device 102 may be configured to determine the CMB routing scheme to route an application stream, e.g., from applications 125, to a selected radio of the plurality of radios 114, e.g., as described below.

In some demonstrative embodiments, controller 124 may be configured to control, cause and/or trigger the STA implemented by device 102 to determine the CMB routing scheme to route the application stream to a selected radio of the plurality of radios 114, for example, based on network condition parameters from the selected radio, e.g., as described below.

In some demonstrative embodiments, controller 124 may be configured to control, cause and/or trigger the STA implemented by device 102 to determine the CMB routing scheme to route the application stream to the selected radio based on whether or not the one or more QoS requirements for the application stream are to be met, for example, based on the network condition parameters from the selected radio, e.g., as described below.

In some demonstrative embodiments, controller 124 may be configured to control, cause and/or trigger the STA implemented by device 102 to determine the CMB routing scheme to route a first application stream to a selected radio of the plurality of radios 114, for example, based on QoS requirements of the first application stream and QoS requirements of at least one second application stream to be routed to the selected radio, e.g., as described below.

In some demonstrative embodiments, controller 124 may be configured to control, cause and/or trigger the STA implemented by device 102 to determine the CMB routing scheme to route the first application stream to the selected radio of the plurality of radios 114, for example, based on whether or not the QoS requirements of the at least one second application are to be met, for example, when the first application stream is to be routed to the selected radio, e.g., as described below.

In some demonstrative embodiments, device 102 may determine the CMB routing scheme based on one or more additional or alternative inputs, e.g., as described below.

In some demonstrative embodiments, device 102 may determine the CMB routing scheme based on band information from an AP, e.g., as described below.

In some demonstrative embodiments, controller 124 may be configured to control, cause and/or trigger the STA implemented by device 102 to route the application stream to an AP, e.g., a device of devices 140, 160 and/or 180, over the wireless communication band, and to determine the CMB routing scheme, for example, based on band information from the AP relating to the wireless communication band, e.g., as described below.

In some demonstrative embodiments, the band information may include a channel load report corresponding to the wireless communication band, e.g., as described below.

In some demonstrative embodiments, the band information from the AP may include a station statistic report, a basic transmission rate of management frames, one or more access delay measurements, a Basic Service Set (BSS) available admission capacity, and/or backbone capacity and latency information, e.g., as described below.

In other embodiments, the band information from the AP may include any other additional or alternative attributes, metrics, measurements, rates, parameters and/or information, e.g., as described below.

In some demonstrative embodiments, controller 124 may be configured to control, cause and/or trigger the STA implemented by device 102 to determine the CMB routing scheme, for example, based on policy information, e.g., as described below.

In some demonstrative embodiments, device 102 may determine the CMB routing scheme, for example, based on policy information, for example, from a user of device 102 and/or a policy from an information technology (IT) repository, a data bank and/or the like, e.g., as described below.

In some demonstrative embodiments, the policy information may include, for example, for the application stream of the plurality of application streams, one or more policies for communication of the application stream over one or more networks, e.g., as described below.

In some demonstrative embodiments, the policy information may include application requirement priority information to prioritize the application stream with respect to one or more other application streams of the plurality of application streams, e.g., as described below.

In some demonstrative embodiments, the policy information may include dynamic routing support and/or network restriction information, for example, to restrict communication of the application stream over the one or more networks, e.g., as described below.

In other embodiments, the policy information may include any other additional or alternative attributes, parameters and/or information.

Figure 3:
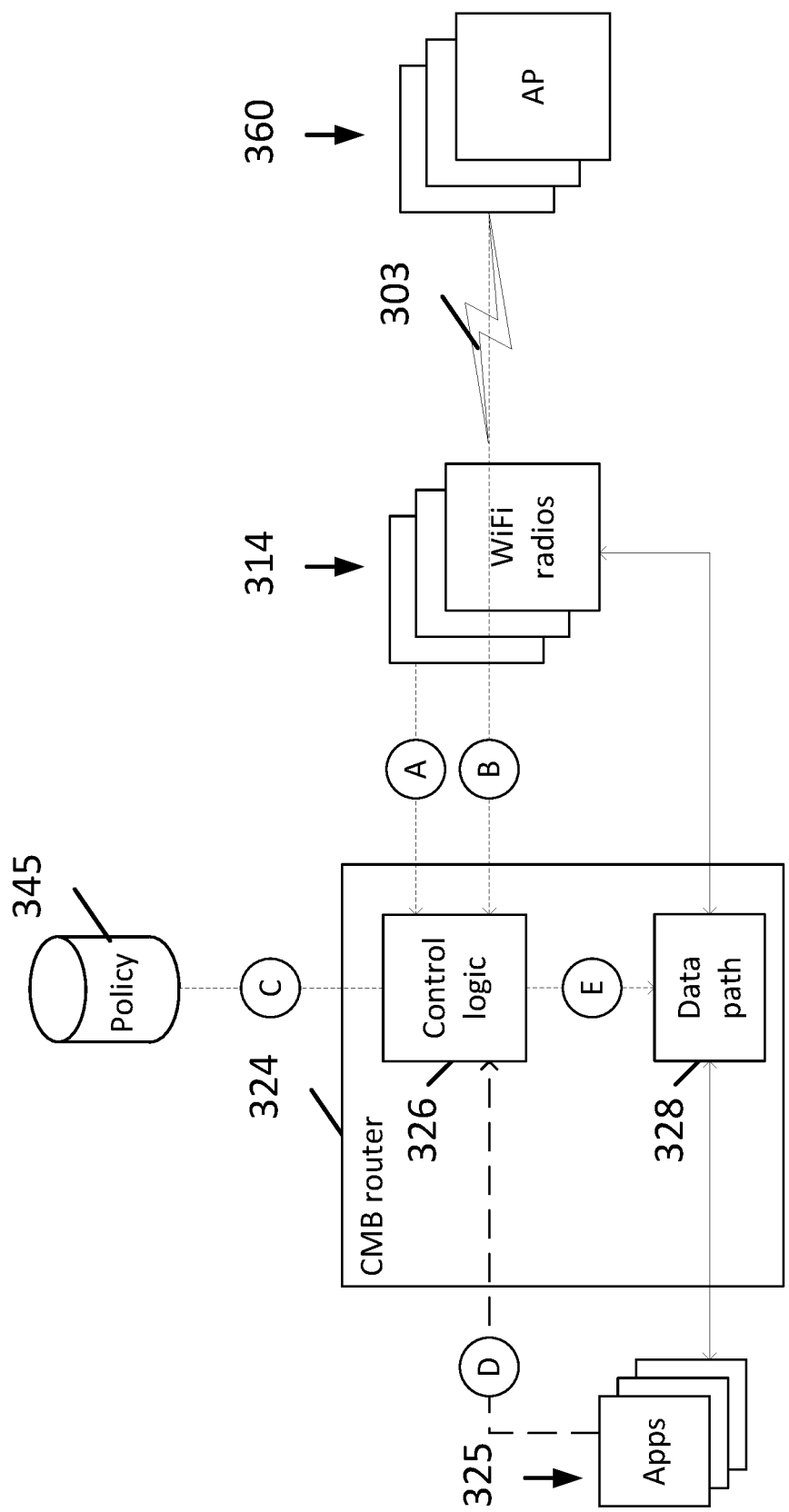
FIG. 3 is a schematic block diagram illustration of an implementation of a CMB router in a CMB communication scheme, in accordance with some demonstrative embodiments.

Reference is made to FIG. 3, which schematically illustrates a block diagram of an implementation of a CMB router 324 in a CMB communication scheme, in accordance with some demonstrative embodiments. For example, controller 124 (FIG. 1) may include, operate as, perform one or more operations of, and/or perform the functionality CMB router 324.

In some demonstrative embodiments, as shown in FIG. 3, CMB router 324 may include a controller 326 configured to receive and process one or more inputs, e.g., including one or more of four inputs, denoted A-D, for example, to determine a CMB routing scheme, e.g., a routing table, to route application streams of one or more applications 325 to a plurality of radios 314, for example, for wireless communication over a network 303.

In some demonstrative embodiments, as shown in FIG. 3, controller 326 may provide the routing table to a data path router 328, e.g., over a data path interface, denoted E.

In some demonstrative embodiments, the data path router 328 may implement application traffic routing and, optionally, one or more address translation functions, for example, based on the routing table.

In some demonstrative embodiments, controller 326 may receive and/or process one or more of the inputs A-D, for example, from one or more interfaces. For example, the input A may be received from a wireless Network Interface Card (NIC) Application Protocol Interface (API) of radios 314; the input B may be received from one or more APs 360; the input C may be received from a User or IT policy repository 345; and/or the input D may be received from an Application QoS requirement API of applications 325, e.g., as described below.

In some demonstrative embodiments, controller 326 may receive and/or process the input A from the WiFi NIC driver API of radios 314.

In some demonstrative embodiments, the input A from the WiFi NIC driver API of radios 314 may include, for example, one or more of the following:
- One or more Tx queuing delay metrics
- One or more Tx/Rx data rate metrics
- One or more Tx/Rx latency metrics
- One or more Tx/Rx jitter metrics
- A Receive signal power (RSSI)
- A Receive SNR In other embodiments, the input A from the WiFi NIC driver API may include any other additional or alternative parameters, metrics, ratios, indicators and/or information.

In some demonstrative embodiments, controller 326 may collect metrics for the different radios 314 and/or different access categories. In one example, the metrics may include average and/or percentiles, e.g. 90% or 95% percentile, a standard deviation, and/or any other metrics. In another example, the metrics may include per-packet information or any other per-packet information. In another example, the metrics may include any other additional or alternative metrics.

In some demonstrative embodiments, controller 326 may receive and/or process the input B from the APs 360, e.g., as described below.

In one example, the input B may be received via a logical interface. For example, an AP may send information to a STA, for example, through an interface control plane, e.g., in accordance with an IEEE802.11 Standard, and the STA may relay the information to the CMB router 324, e.g., via the WiFi NIC driver API.

In some demonstrative embodiments, the input B from the APs 360 may include information reported by an AP of APs 360, e.g., as defined in an IEEE802.11 Standard, which may include, for example, one or more of the following:
- A Channel load report
- A Station statistics report including number of stations and data rate metrics
- A Basic rate used for beacons and other management frames
- An Access delay measurement
- A BSS available admission capacity
- A Backbone capacity and latency In other embodiments, the input B from the APs 360 may include any other additional or alternative parameters, metrics, measurements, rates, indicators and/or information.

In some demonstrative embodiments, controller 326 may receive and/or process the input C from the user or the IT policy repository 345. For example, the input C from the user or the IT policy repository 345 may include, for example, one or more of the following:
- Network usage restrictions per application type:
  - Applications with higher security requirement may not be allowed to be routed on certain networks, e.g. network blacklist/whitelist per application, minimum security policy requirements per application, and/or the like.
  - IT might not allow best-effort applications with high network usage to use certain networks allocated for latency-sensitive traffic, or, alternately, an IT or user policy prioritizing specific networks for some of the applications.
- Application requirement priority.
- Dynamic routing support.

In other embodiments, the input C may include any other additional or alternative policies, conditions, priorities, and/or information.

In some demonstrative embodiments, controller 326 may receive and/or process the input D from applications 325. For example, the input D from applications 325 may include QoS requirement per application, e.g., as follows:
- A Maximum acceptable latency
- A Maximum acceptable jitter
- A Minimum required average traffic rate
- A Minimum required peak traffic rate In one example, the application QoS requirements may be based on configured profiles and/or heuristics-based traffic matching to a profile. For example, an application may be matched to a gaming profile and, accordingly, a gaming configured QoS may be applied to the application.

In another example, the input D from applications 325 may include any other additional or alternative parameters, metrics, measurements, rates, indicators and/or information.

In some demonstrative embodiments, controller 326 may be configured to route each stream to a different BSS, for example, for applications having multiple network streams, e.g., with different QoS requirements for each of the network streams.

In some demonstrative embodiments, controller 326 may be configured to process some or all of the inputs A-D, and to dynamically update the traffic routing table for a suitable match, e.g., an optimal match, between the application QoS requirements of applications 325, and an expected QoS, e.g., according to the inputs A-D.

In some demonstrative embodiments, the CMB router control logic 326 may consider an application requirement priority input and may attempt to meet the QoS requirement of high priority applications first, for example, if the requirements are not expected to be fully met, e.g., as described below.

In some demonstrative embodiments, controller 326 may be configured to consider different QoS requirements, which may be expected in upstream and/or downstream directions.

In some demonstrative embodiments, controller 326 may be configured to update, e.g., via interface E, the routing table for data path router 328, for example, based on one or more triggers and/or events, e.g., as described below.

In some demonstrative embodiments, the one or more triggers and/or events may include, for example, an establishment of a new application session, a termination of a new application session, a change in one or more application QoS requirements, a new BSS connection, termination of an existing BSS connection, and/or a significant change in BSS conditions.

In other embodiments, controller 326 may be configured to update the routing table based on any other additional or alternative events and/or triggers.

In some demonstrative embodiments, controller 326 may be configured to use one or more Hysteresis margins and/or timers, for example, to avoid too frequent changes in the routing table.

Figure 4:
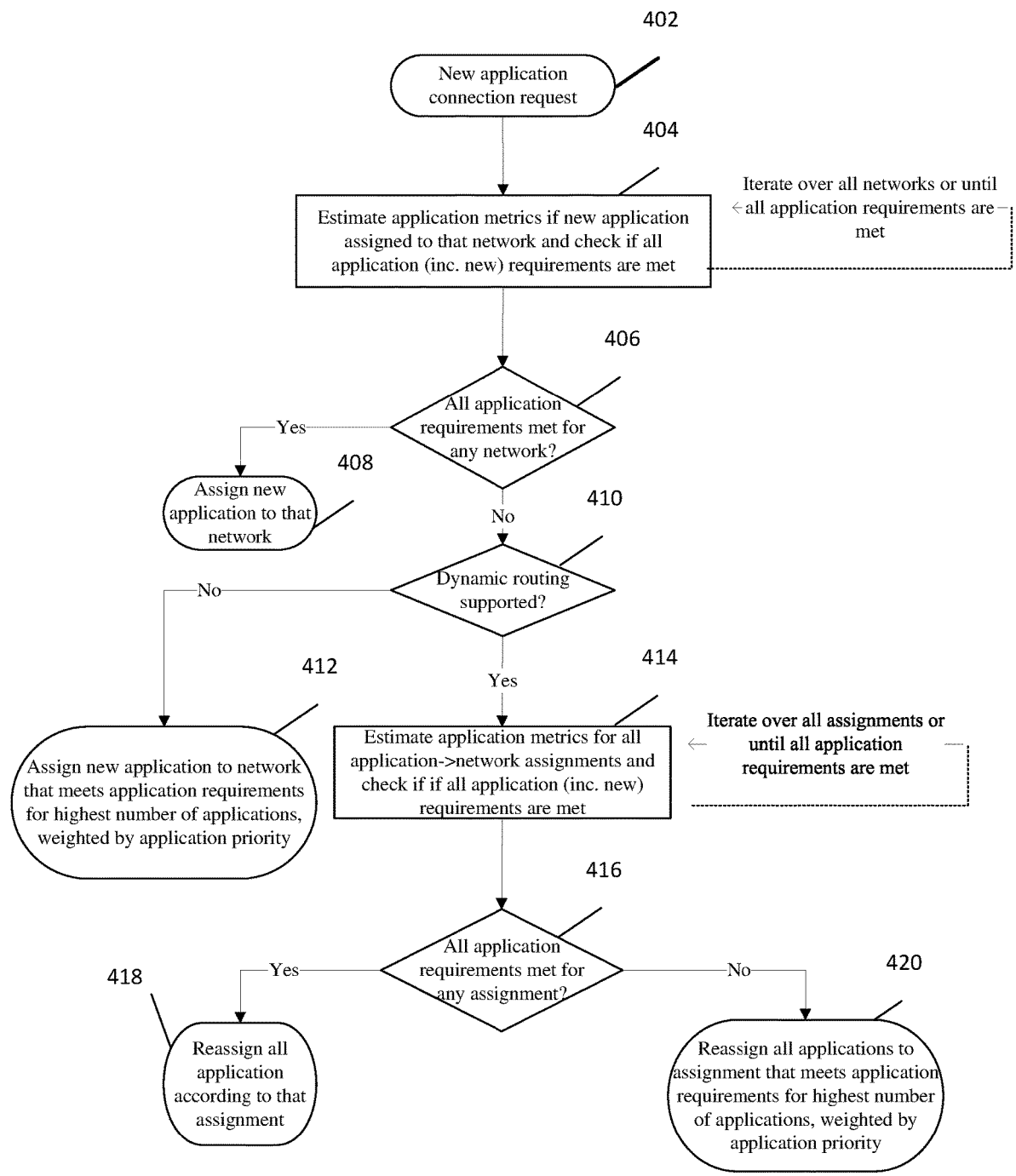
FIG. 4 is a schematic flow-chart illustration of a method of updating a CMB routing scheme, in accordance with some demonstrative embodiments.

Reference is made to FIG. 4, which schematically illustrates a method of updating a CMB routing scheme, in accordance with some demonstrative embodiments. For example, one or more of the operations of the method of FIG. 4 may be performed by a wireless communication system, e.g., system 100 (FIG. 1); a wireless communication device, e.g., device 102 (FIG. 1); a controller, e.g., controller 124 (FIG. 1); a CMB router, e.g., CMB router 324 (FIG. 3); and/or a CMB controller, e.g., CMB controller 326 (FIG. 3).

As indicated at block 402, the method may be initiated based on a new application connection request or any other event or trigger, e.g., as described above.

As indicated at block 404, the method may include iterating over all networks and estimating, e.g., for each network, QoS requirements of all applications assigned to the network are to be met, for example, when the new application is to be assigned to the network.

As indicated at block 406, the method may include determining whether or not the QoS requirements of all applications assigned to a particular network are to be met when assigning the new application to the particular network.

As indicated at block 408, the method may include assigning the new application to the particular network, when the QoS requirements of all applications assigned to the particular network are to be met.

As indicated at block 410, the method may include determining whether or not dynamic routing is supported, for example, when QoS requirements of one or more applications assigned to each network are not met.

As indicated at block 412, the method may include assigning the new application to a network that has the highest number of applications with their QoS requirements met, for example, weighted by application priority, for example, when the dynamic routing is not supported.

As indicated at block 414, the method may include iterating over all possible assignments of applications to networks, and estimating application metrics for each possible assignment to determine if the network QoS requirements of all applications are to be met.

As indicated at block 416, the method may include determining whether or not the QoS requirements of all applications are to be met when reassigning the applications to the networks based on a possible assignment.

As indicated at block 418, the method may include reassigning the applications to the networks according to the possible assignment, for example, when the QoS requirements of all applications according to the possible assignment are to be met.

As indicated at block 420, the method may include reassigning the applications to a particular possible assignment, e.g., having the highest number of applications with their QoS requirements met, for example, weighted by application priority, for example, when any possible assignment is not to meet all QoS requirements of all applications.

Figure 5:
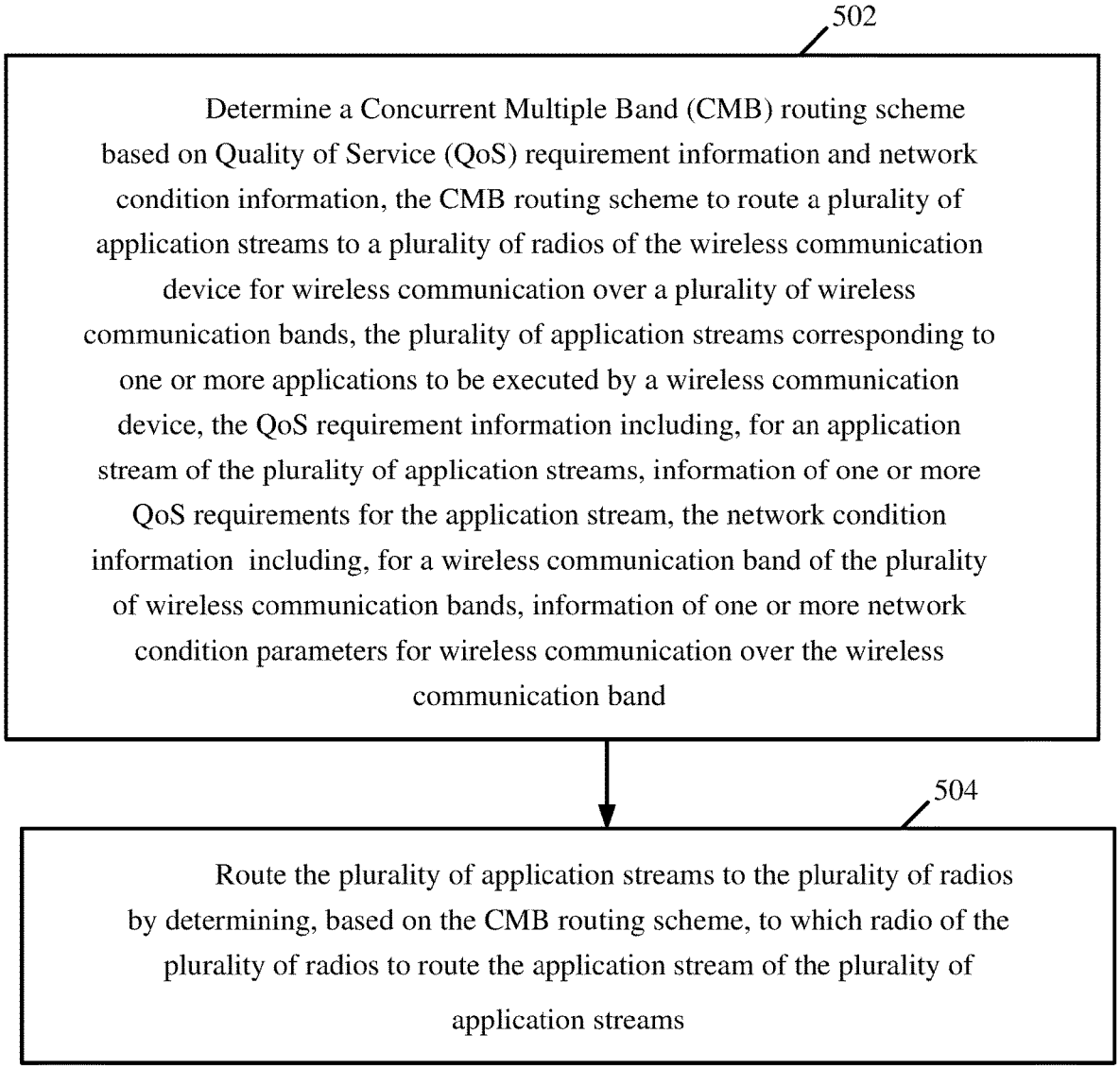
FIG. 5 is a schematic flow-chart illustration of a method of CMB wireless communication, in accordance with some demonstrative embodiments.

Reference is made to FIG. 5, which schematically illustrates a method of CMB wireless communication. For example, one or more of the operations of the method of FIG. 5 may be performed by a wireless communication system, e.g., system 100 (FIG. 1); a wireless communication device, e.g., device 102 (FIG. 1); a controller, e.g., controller 124 (FIG. 1); a CMB router, e.g., CMB router 324 (FIG. 3); and/or a CMB controller, e.g., CMB controller 326 (FIG. 3).

As indicated at block 502, the method may include determining at a wireless communication device, a CMB routing scheme based on QoS requirement information and network condition information, the CMB routing scheme to route a plurality of application streams to a plurality of radios of the wireless communication device for wireless communication over a plurality of wireless communication bands, the plurality of application streams corresponding to one or more applications to be executed by the wireless communication device, the QoS requirement information including, for an application stream of the plurality of application streams, information of one or more QoS requirements for the application stream, the network condition information including, for a wireless communication band of the plurality of wireless communication bands, information of one or more network condition parameters for wireless communication over the wireless communication band. For example, controller 124 (FIG. 1) may control, cause and/or trigger the STA implemented by device 102 (FIG. 1) to determine the CMB routing scheme based on the QoS requirement information and the network condition information, the CMB routing scheme to route the plurality of application streams to the plurality of radios 114 (FIG. 1) for wireless communication over the plurality of wireless communication bands, the plurality of application streams corresponding to the one or more applications 125 (FIG. 1) to be executed by device 102 (FIG. 1), the QoS requirement information including, for the application stream of the plurality of application streams, information of the one or more QoS requirements for the application stream, the network condition information including, for the wireless communication band of the plurality of wireless communication bands, information of the one or more network condition parameters for the wireless communication over the wireless communication band, e.g., as described above.

As indicated at block 504, the method may include routing the plurality of application streams to the plurality of radios by determining, based on the CMB routing scheme, to which radio of the plurality of radios to route the application stream of the plurality of application streams. For example, controller 124 (FIG. 1) may control, cause and/or trigger the STA implemented by device 102 (FIG. 1) to route the plurality of application streams to the plurality of radios 114 (FIG. 1) by determining, based on the CMB routing scheme, to which radio of the plurality of radios 114 to route the application stream of the plurality of application streams, e.g., as described above.

Figure 6:
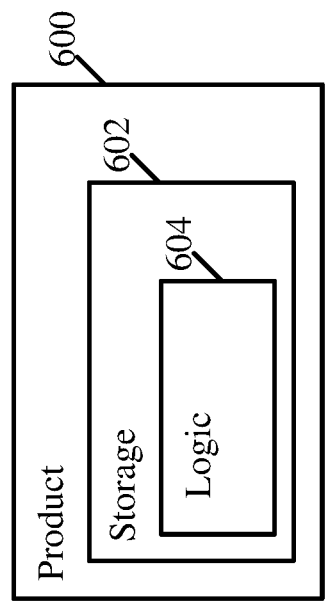
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable ("machine readable") non-transitory storage media 602, which may include computer-executable instructions, e.g., implemented by logic 604, operable to, when executed by at least one processor, e.g., computer processor, enable the at least one processor to implement one or more operations at device 102 (FIG. 1), controller 124 (FIG. 1), CMB router 324 (FIG. 3), and/or CMB controller 326 (FIG. 3), to cause device 102 (FIG. 1), controller 124 (FIG. 1), CMB router 324 (FIG. 3), and/or CMB controller 326 (FIG. 3) to perform one or more operations, and/or to perform, trigger and/or implement one or more operations, communications and/or functionalities described above with reference to FIGS. 1, 2, 3, 4, and/or 5, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 600 and/or storage media 602 may include one or more types of computer-readable storage media capable of storing data, including volatile memory, non-volatile memory, removable or non-removable memory, erasable or non-erasable memory, writeable or re-writeable memory, and the like. For example, storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus including logic and circuitry configured to cause a wireless communication device to determine a Concurrent Multiple Band (CMB) routing scheme based on Quality of Service (QoS) requirement information and network condition information, the CMB routing scheme to route a plurality of application streams to a plurality of radios of the wireless communication device for wireless communication over a plurality of wireless communication bands, the plurality of application streams corresponding to one or more applications to be executed by the wireless communication device, the QoS requirement information comprising, for an application stream of the plurality of application streams, information of one or more QoS requirements for the application stream, the network condition information comprising, for a wireless communication band of the plurality of wireless communication bands, information of one or more network condition parameters for wireless communication over the wireless communication band; and route the plurality of application streams to the plurality of radios by determining, based on the CMB routing scheme, to which radio of the plurality of radios to route the application stream of the plurality of application streams.

Example 2 includes the subject matter of Example 1, and optionally, wherein the apparatus is configured to cause the wireless communication device to dynamically update the CMB routing scheme based on a change in at least one of the QoS requirement information or the network condition information.

Example 3 includes the subject matter of Example 1 or 2, and optionally, wherein the apparatus is configured to cause the wireless communication device to determine the CMB routing scheme to route the application stream to a selected radio of the plurality of radios based on network condition parameters from the selected radio.

Example 4 includes the subject matter of Example 3, and optionally, wherein the apparatus is configured to cause the wireless communication device to determine the CMB routing scheme to route the application stream to the selected radio of the plurality of radios based on whether or not the one or more QoS requirements for the application stream are to be met based on the network condition parameters from the selected radio.

Example 5 includes the subject matter of any one of Examples 1-4, and optionally, wherein the apparatus is configured to cause the wireless communication device to determine the CMB routing scheme to route a first application stream to a selected radio of the plurality of radios based on QoS requirements of the first application stream and QoS requirements of at least one second application stream to be routed to the selected radio.

Example 6 includes the subject matter of Example 5, and optionally, wherein the apparatus is configured to cause the wireless communication device to determine the CMB routing scheme to route the first application stream to the selected radio of the plurality of radios based on whether or not the QoS requirements of the at least one second application are to be met when the first application stream is to be routed to the selected radio.

Example 7 includes the subject matter of any one of Examples 1-6, and optionally, wherein the apparatus is configured to cause the wireless communication device to determine the CMB routing scheme to route a first application stream of a first application of the one or more applications to a first radio of the plurality of radios, and to route a second application stream of a second application of the one or more applications to a second radio of the plurality of radios.

Example 8 includes the subject matter of any one of Examples 1-7, and optionally, wherein the apparatus is configured to cause the wireless communication device to determine the CMB routing scheme to route a first application stream of a particular application of the one or more applications to a first radio of the plurality of radios, and to route a second application stream of the particular application to a second radio of the plurality of radios.

Example 9 includes the subject matter of any one of Examples 1-8, and optionally, wherein the one or more QoS requirements for the application stream comprise a maximal acceptable latency of packets of the application stream.

Example 10 includes the subject matter of any one of Examples 1-9, and optionally, wherein the one or more QoS requirements for the application stream comprise a minimum average traffic rate.

Example 11 includes the subject matter of any one of Examples 1-10, and optionally, wherein the one or more QoS requirements for the application stream comprise at least one of a maximum acceptable jitter, or a minimum required peak traffic rate.

Example 12 includes the subject matter of any one of 1-11, and optionally, wherein the one or more network condition parameters comprise one or more channel receive or transmit latency metrics.

Example 13 includes the subject matter of any one of Examples 1-12, and optionally, wherein the one or more network condition parameters comprise a transmit or receive data rate of traffic.

Example 14 includes the subject matter of any one of Examples 1-13, and optionally, wherein the one or more network condition parameters comprise one or more transmit queuing delay metrics.

Example 15 includes the subject matter of any one of Examples 1-14, and optionally, wherein the one or more network condition parameters comprise at least one of a Receive Signal Strength Indicator (RSSI), one or more transmit or receive jitter metrics, or a receive Signal to Noise Ratio (SNR).

Example 16 includes the subject matter of any one of Examples 1-15, and optionally, wherein the apparatus is configured to cause the wireless communication device to route the application stream to an Access Point (AP) over the wireless communication band, and to determine the CMB routing scheme based on band information from the AP relating to the wireless communication band.

Example 17 includes the subject matter of Example 16, and optionally, wherein the band information comprises a channel load report corresponding to the wireless communication band.

Example 18 includes the subject matter of Example 16 or 17, and optionally, wherein the band information from the AP comprises at least one of a station statistic report, a basic transmission rate of management frames, one or more access delay measurements, a Basic Service Set (BSS) available admission capacity, or backbone capacity and latency information.

Example 19 includes the subject matter of any one of Examples 1-18, and optionally, wherein the apparatus is configured to cause the wireless communication device to determine the CMB routing scheme based on policy information, the policy information comprising, for the application stream of the plurality of application streams, one or more policies for communication of the application stream over one or more networks.

Example 20 includes the subject matter of Example 19, and optionally, wherein the policy information comprises application requirement priority information to prioritize the application stream with respect to one or more other application streams of the plurality of application streams.

Example 21 includes the subject matter of Example 19 or 20, and optionally, wherein the policy information comprises at least one of dynamic routing support or network restriction information to restrict communication of the application stream over the one or more networks.

Example 22 includes the subject matter of any one of Examples 1-21, and optionally, wherein the plurality of wireless communication bands comprises at least one of a 2.4 Gigahertz (GHz) band, a 5 GHz band, or a 6 GHz band.

Example 23 includes the subject matter of any one of Examples 1-22, and optionally, comprising the plurality of radios.

Example 24 includes the subject matter of Example 23, and optionally, comprising one or more antennas connected to the plurality of radios, a memory to store data processed by the wireless communication device, and a processor to execute instructions of the one or more applications.

Example 25 comprises an apparatus comprising means for executing any of the described operations of Examples 1-24.

Example 26 comprises a machine-readable medium that stores instructions for execution by a processor to perform any of the described operations of Examples 1-24.

Example 27 comprises an apparatus comprising: a memory interface; and processing circuitry configured to: perform any of the described operations of Examples 1-24.

Example 28 comprises a method to perform any of the described operations of Examples 1-24.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    a processor configured to cause a wireless communication device to:
        determine a Concurrent Multiple Band (CMB) routing scheme to route a plurality of application streams to a plurality of radios of the wireless communication device, wherein the CMB routing scheme is configured to route a first application stream of an application to a first radio of the wireless communication device for wireless communication over a first wireless communication band, and to route a second application stream of the application to a second radio of the wireless communication device for wireless communication over a second wireless communication band, wherein the second wireless communication band is different from the first wireless communication band, wherein the CMB routing scheme is based on a latency-based requirement of the application; and
        route the plurality of application streams to the plurality of radios according to the CMB routing scheme; and
    a memory to store information processed by the processor.

2. The apparatus of claim 1 configured to cause the wireless communication device to update the CMB routing scheme based on a change in a network condition corresponding to at least one of the first wireless communication band or the second wireless communication band.

3. The apparatus of claim 1 configured to cause the wireless communication device to monitor network condition information corresponding to at least one of the first wireless communication band or the second wireless communication band, and to update the CMB routing scheme based on a change in the network condition information.

4. The apparatus of claim 1 configured to cause the wireless communication device to determine the CMB routing scheme to route the first application stream to a selected radio of the plurality of radios based on one or more network condition parameters from the selected radio.

5. The apparatus of claim 2 configured to cause the wireless communication device to determine the CMB routing scheme to route the first application stream to the selected radio based on whether or not the latency-based requirement of the application is to be met based on the network condition parameters from the selected radio.

6. The apparatus of claim 1 configured to cause the wireless communication device to determine the CMB routing scheme to route the first application stream to the first radio and the second application stream to the second radio based on whether or not the latency-based requirement of the application is to be met when the first application stream is to be routed to the first radio, and whether or not the latency-based requirement of the application is to be met when the second application stream is to be routed to the second radio.

7. The apparatus of claim 1, wherein the latency-based requirement of the application comprises a maximal acceptable latency of packets.

8. The apparatus of claim 1, wherein the latency-based requirement of the application comprises a minimum average traffic rate.

9. The apparatus of claim 1, wherein the CMB routing scheme is based on a jitter requirement of the application.

10. The apparatus of claim 1, wherein the first wireless communication band comprises a first band from a 2.4 Gigahertz (GHz) band, a 5 GHz band, or a 6 GHz band, and wherein the second wireless communication band comprises a second band from the 2.4 GHz band, the 5 GHz band, or the 6 GHz band.

11. The apparatus of claim 1 comprising the plurality of radios, and one or more antennas connected to the plurality of radios.

12. A product comprising one or more tangible computer-readable non-transitory storage media comprising computer-executable instructions operable to, when executed by at least one processor, enable the at least one processor to cause a wireless communication device to:
  determine a Concurrent Multiple Band (CMB) routing scheme to route a plurality of application streams to a plurality of radios of the wireless communication device, wherein the CMB routing scheme is configured to route a first application stream of an application to a first radio of the wireless communication device for wireless communication over a first wireless communication band, and to route a second application stream of the application to a second radio of the wireless communication device for wireless communication over a second wireless communication band, wherein the second wireless communication band is different from the first wireless communication band, wherein the CMB routing scheme is based on a latency-based requirement of the application; and
  route the plurality of application streams to the plurality of radios according to the CMB routing scheme.

13. The product of claim 12, wherein the instructions, when executed, cause the wireless communication device to update the CMB routing scheme based on a change in a network condition corresponding to at least one of the first wireless communication band or the second wireless communication band.

14. The product of claim 12, wherein the instructions, when executed, cause the wireless communication device to monitor network condition information corresponding to at least one of the first wireless communication band or the second wireless communication band, and to update the CMB routing scheme based on a change in the network condition information.

15. The product of claim 12, wherein the instructions, when executed, cause the wireless communication device to determine the CMB routing scheme to route the first application stream to a selected radio of the plurality of radios based on one or more network condition parameters from the selected radio.

16. The product of claim 12, wherein the latency-based requirement of the application comprises a maximal acceptable latency of packets.

17. The product of claim 12, wherein the CMB routing scheme is based on a jitter requirement of the application.

18. The product of claim 12, wherein the first wireless communication band comprises a first band of a 2.4 Gigahertz (GHz) band, a 5 GHz band, or a 6 GHz band, and wherein the second wireless communication band comprises a second band of the 2.4 GHz band, the 5 GHz band, or the 6 GHz band.

19. An apparatus of a wireless communication device, the apparatus comprising:
  means for determining a Concurrent Multiple Band (CMB) routing scheme to route a plurality of application streams to a plurality of radios of the wireless communication device, wherein the CMB routing scheme is configured to route a first application stream of an application to a first radio of the wireless communication device for wireless communication over a first wireless communication band, and to route a second application stream of the application to a second radio of the wireless communication device for wireless communication over a second wireless communication band, wherein the second wireless communication band is different from the first wireless communication band, wherein the CMB routing scheme is based on a latency-based requirement of the application; and
  means for routing the plurality of application streams to the plurality of radios according to the CMB routing scheme.

20. The apparatus of claim 19 comprising means for updating the CMB routing scheme based on a change in a network condition corresponding to at least one of the first wireless communication band or the second wireless communication band.

* * * * *